(12) United States Patent
Hirono et al.

(10) Patent No.: US 7,352,598 B2
(45) Date of Patent: Apr. 1, 2008

(54) INVERTER UNITS WITH DUTY CYCLE CONTROL BASED ON THE DETECTED, HIGH AND LOW OUTPUT VOLTAGE

(75) Inventors: Daisuke Hirono, Isesaki (JP); Makoto Shibuya, Kiryu (JP)

(73) Assignee: Sanden Corporation, Isesaki-shi, Gunma (*) Notice: Subject to any disclaimer, the term of this patent is extended or adjusted under 35 U.S.C. 154(b) by 13 days.

(21) Appl. No.: 11/366,512

(22) Filed: Mar. 3, 2006

(65) Prior Publication Data
US 2006/0198166 A1 Sep. 7, 2006

(30) Foreign Application Priority Data
Mar. 3, 2005 (JP) .............................. 2005-058843

(51) Int. Cl.
*H02M 3/335* (2006.01)
*H02M 7/5387* (2007.01)
(52) U.S. Cl. .......................... 363/41; 363/132; 363/98; 363/17
(58) Field of Classification Search ................. 363/17, 363/41, 95, 98, 131, 132
See application file for complete search history.

(56) References Cited

U.S. PATENT DOCUMENTS 6,396,225 B1 * 5/2002 Wakui et al. ............... 318/254
6,753,665 B2 * 6/2004 Ueda et al. ................. 318/135
7,064,514 B2 * 6/2006 Iwaji et al. ................. 318/801
7,075,264 B2 * 7/2006 Huggett et al. ............. 318/722
7,164,253 B2 * 1/2007 Sato et al. .................. 318/801
7,176,651 B2 * 2/2007 Kifuku et al. .............. 318/801
7,190,130 B2 * 3/2007 Wogari et al. .............. 318/254

FOREIGN PATENT DOCUMENTS

JP          3084941           7/2000

* cited by examiner

*Primary Examiner*—Bao Q. Vu
(74) *Attorney, Agent, or Firm*—Baker Botts, L.L.P.

(57) ABSTRACT

An inverter unit includes a DC power source, an inverter circuit having two or more pairs of switching elements which are connected in parallel to the DC power source, so that a DC voltage of the DC power source is converted into a pulse train-like, pseudo-AC voltage output from the inverter circuit, and a PWM generator connected to the inverter circuit for adjusting the pseudo-AC voltage by pulse width modulation. Further, the inverter unit includes a voltmeter for detecting an actual, output voltage which is output from the inverter circuit, and a duty cycle controller for controlling an output duty cycle, so that the detected, actual, output voltage becomes a target output voltage. In this inverter unit, a desirable, output voltage may be obtained stably and accurately even if a voltage of a power source fluctuates.

4 Claims, 2 Drawing Sheets

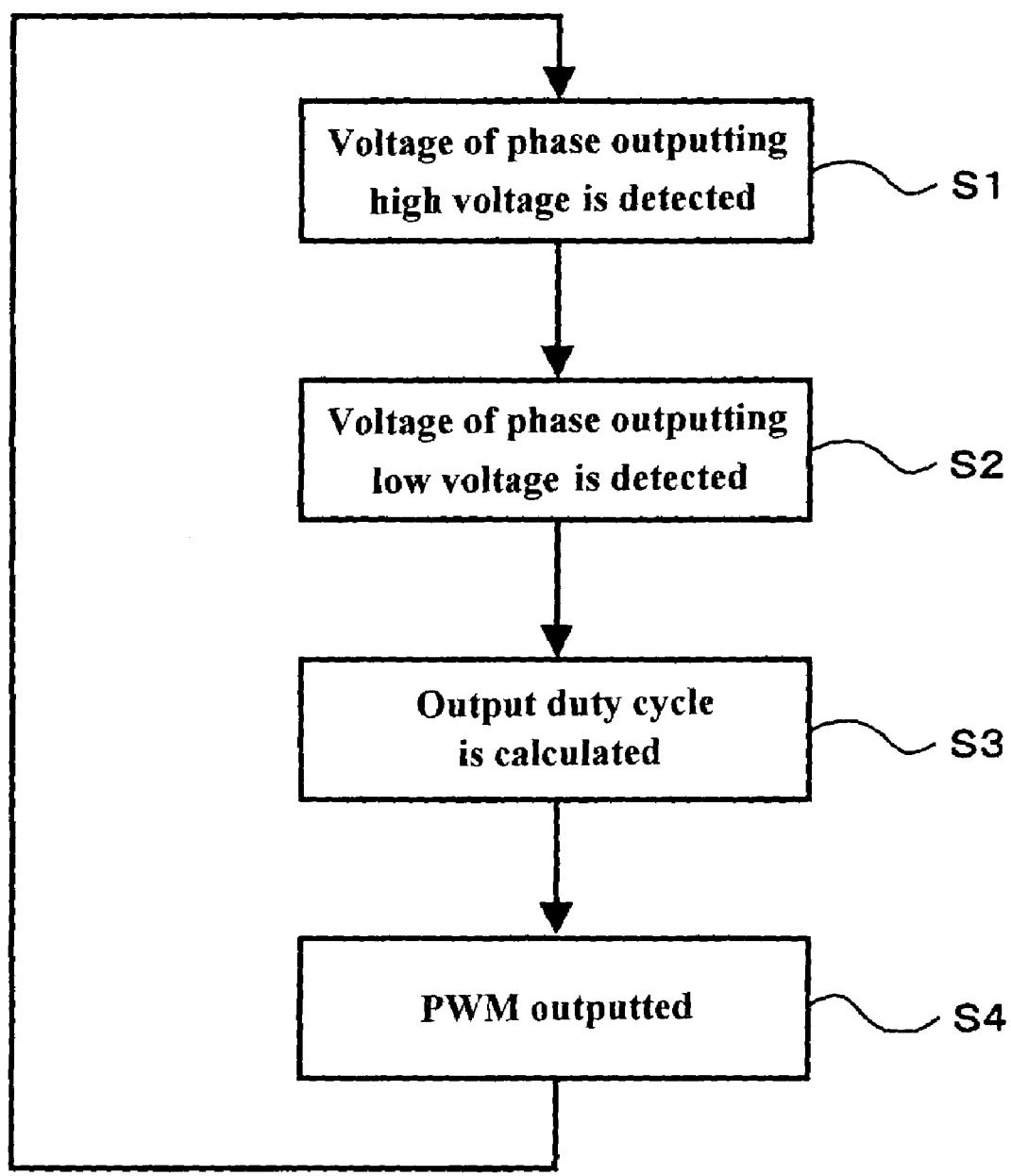

INVERTER UNITS WITH DUTY CYCLE CONTROL BASED ON THE DETECTED, HIGH AND LOW OUTPUT VOLTAGE

BACKGROUND OF THE INVENTION

1. Field of the Invention

The present invention relates to inverter units, and more specifically, to inverter units which may stabilize an output from an inverter circuit, so that an output voltage does not vary even if a voltage of a power source varies, when a direct current (DC) voltage of a DC power source for use in vehicles is converted into a pulse train-like, pseudo-alternating current (AC) voltage using a plurality of switching elements.

2. Description of Related Art

For example, a DC power source, such as a battery, may be mounted on a vehicle, and a DC voltage of the DC power source is used for various purposes and controls. This DC voltage of the DC power source is converted into a pulse train-like, pseudo-AC voltage by using an inverter circuit having a plurality of switching elements. The pseudo-AC voltage is used by a motor for driving a compressor (e.g., a brushless motor of a motor-driven compressor and the like) in an air conditioning system for vehicles, or for driving other motors (e.g., a reluctance motor or an induction motor), or as an output voltage which is output to a transformer and other devices.

In a compressor, such as a refrigerant compressor, used in an air conditioning system for vehicles, although the compressor may use an engine rotational force as its drive source, such as in a motor-driven compressor or a hybrid compressor, the compressor often includes a brushless motor. This brushless motor is driven by a pulse train-like, pseudo-AC voltage converted by an inverter circuit, and the rotational speed is controlled by a method for controlling a supplied effective voltage by altering a duty cycle ratio of the pseudo-AC voltage, that is, by pulse width modulation (PWM).

Nevertheless, a DC power source mounted on a vehicle, such as a battery, may generate a voltage fluctuation in relation to an electric load. For example, in a vehicle, such as an electric vehicle or a hybrid vehicle, having a motor for running the vehicle, when accelerated; the voltage of the DC power source may decrease rapidly due to large load current flowing in the motor for running the vehicle, and when decelerated, the voltage of the DC power source may increase rapidly due to a regenerative current from the motor for running the vehicle. Further, even in a vehicle driven by an internal combustion engine, if the power of the DC power source is used in a large amount, the voltage of the DC power source may decrease rapidly.

When such a fluctuation of the voltage of the DC power source occurs, the output voltage varies proportionately thereto. For example, when the above-described, brushless motor is driven; accompanying this voltage fluctuation, the rotational speed of the motor may be accelerated or decelerated rapidly. Further, when decelerated, an excess current may flow, and in a worst case, the rotation of the motor is stopped by the operation of a protective circuit.

In response to such problems, Japanese Patent No. 3,084,941 discloses a control method, wherein a voltage of a DC power source is detected, and a duty cycle is controlled in response to the detected voltage value.

Nevertheless, when controlled by such a method, it may become difficult to obtain a desirable output stably and accurately. In particular, in the above-described, control method, a time delay due to a processing speed of the control unit, or the like, may occur between the recognition of the fluctuation of the voltage of the DC power source and the adjustment of the duty cycle, and, therefore, it may be difficult to adjust the duty cycle quickly and properly. Consequently, a fluctuation of rotational speed, excess current or lack of torque in the brushless motor, or the like, may occur.

SUMMARY OF THE INVENTION

Accordingly, it is an object of the present invention to provide an inverter unit which may obtain consistently a desirable output voltage stably and accurately even if a voltage of a power source fluctuates, when a voltage of a DC power source is converted into a pulse train-like, pseudo-AC voltage using an inverter circuit with a plurality of switching elements.

To achieve the foregoing and other objects, an inverter unit according to the present invention comprises a DC power source, an inverter circuit having a plurality of pairs of switching elements, and a PWM generator connected to the inverter circuit for adjusting the pseudo-AC voltage by pulse width modulation. In each pair of switching elements, the switching elements are coupled in series, and the pairs of switching elements are connected in parallel to the DC power source, so that a DC voltage of the DC power source is converted into a pulse train-like, pseudo-AC voltage output from the inverter circuit. The inverter unit comprises means for detecting an actual output voltage which is output from the inverter circuit, and means for controlling an output duty cycle, so that an output voltage detected by the means for detecting becomes a target output voltage. In particular, in the present invention, a voltage of a DC power source is not detected, but a voltage value actually output is detected, and based on the detected voltage value, an output duty cycle is controlled, so that the detected output voltage becomes a target output voltage.

In the inverter unit according to the present invention, the above-described target output voltage may be provided, for example, from an output indicator to the PWM generator. The above-described, output duty cycle may be equal to a target output voltage divided by the difference between the detected, high output voltage and the detected, low output voltage.

In this relationship, the high output voltage is a maximum voltage value in the pulse train-like, pseudo-AC voltage, and the low output voltage is a minimum voltage value in the pulse train-like, pseudo-AC voltage. In particular, a voltage of an high output phase and a voltage of a low output phase are detected, and the output duty cycle is determined based on the above-described relationship. The maximum value of this output duty cycle is 100%.

Further, the output duty cycle may be calculated without detecting one of an high output voltage or a low output voltage. This undetected value becomes a reference for output voltage, and the value of the non-detected output voltage is set at zero.

The value of the output voltage ($V_o$) may be equal to an output duty cycle in percent multiplied by a reference voltage at the time of 100% duty cycle ($V_{dc}$).

In such an inverter unit according to the present invention, actually output voltage (e.g., high output voltage or low output voltage) is detected, an output duty cycle is calculated based on the above-described equation, so that the output voltage becomes, for example, a set value of the output indicator (i.e., a target output voltage), and PWM control is accomplished. Therefore, irrespective of a voltage reduction of a power source or a fluctuation of a voltage of a power source, a desirable output voltage may be obtained stably. For example, when voltage is output to a motor, an output effective voltage to the motor may be controlled at a target value stably and accurately.

Further, in the inverter unit according to the present invention, for example, when applied to drive a three-phase, brushless motor, although it usually is necessary to detect an output voltage to the motor in order to drive the motor, it is possible to utilize the detection mechanism as it is. In addition, because it is not necessary to add a detection circuit for a voltage of a power source, the present invention may be achieved by a less complicated circuit.

Thus, in the inverter unit according to the present invention, because the output duty is determined by detecting an actual output voltage, even if the voltage of the DC power source fluctuates, regardless of the amount and composition of the fluctuation and without occurrence of time delay relative to the fluctuation of the voltage of the power source, the output voltage may be controlled at a target voltage value stably and accurately. Therefore, when the present invention is applied to control an output to a motor, even if the voltage of the DC power source fluctuates, the rotational speed of the motor may be maintained at a target rotational speed stably and accurately. Further, the present invention may be achieved by a less complicated circuit.

Further objects, features, and advantages of the present invention will be understood from the following detailed description of a preferred embodiment of the present invention with reference to the accompanying figures.

BRIEF DESCRIPTION OF THE DRAWINGS

An embodiment of the invention now is described with reference to the accompanying figures, which is given by way of example only, and is not intended to limit the present invention.

FIG. 2 is a flowchart showing an example of the control method of the inverter unit depicted in FIG. 1.

DETAILED DESCRIPTION OF PREFERRED EMBODIMENTS

Figure 1:
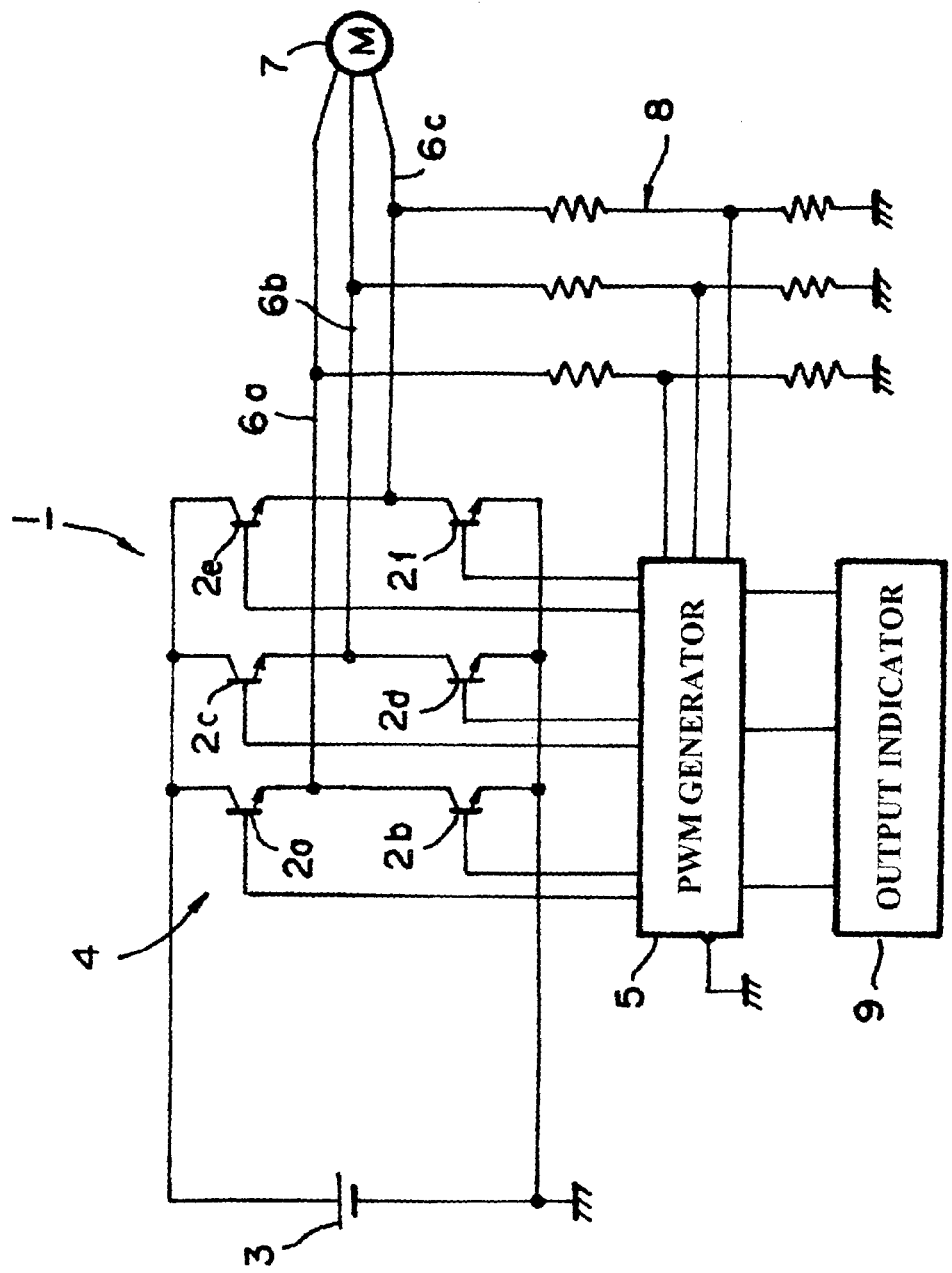
FIG. 1 is a schematic circuit diagram of an inverter unit according to an embodiment of the present invention.

FIG. 1 depicts an inverter unit according to an embodiment of the present invention, and in particular, shows an embodiment in which it is formed as a motor drive, power source circuit, which outputs a pulse train-like, pseudo-AC voltage to a three-phase motor (e.g., a three-phase, brushless motor incorporated into a compressor and used in an air conditioning system for vehicles). In FIG. 1, inverter unit 1 comprises a DC power source 3 and an inverter circuit 4. Inverter circuit 4 comprises a plurality of pairs of switching elements, and each pair of switching elements 2a and 2b, 2c and 2d, and/or 2e and 2f are coupled in series to form each pair of switching elements. The plurality of pairs of switching elements are connected in parallel to DC power source 3 to form inverter circuit 4, so that a DC voltage of DC power source 3 is converted into a pulse train-like, pseudo-AC voltage and the converted, pseudo AC voltage is output. In the embodiment depicted in FIG. 1, inverter unit 1 comprises three pairs of switching elements.

A PWM generator 5 for adjusting the above-described, pseudo-AC voltage by pulse width modulation is connected to inverter circuit 4. Three output phases 6a, 6b, and 6c from inverter circuit 4 are connected respectively to corresponding poles of motor 7, and motor 7 is rotated at a predetermined rotational speed by having a predetermined voltage applied to it. For example, motor 7 may be a three-phase, brushless motor. Nevertheless, any other-type motor capable of being driven by an applied, pseudo-AC voltage may be used. A pulse train-like, pseudo-AC voltage is output to motor 7. Any one phase among output phases 6a, 6b, and 6c is set as a phase for outputting an high output voltage, and any other phase is set as a phase for outputting a low output voltage. An average voltage of the pulse train-like, pseudo-AC voltage becomes an effective voltage applied to motor 7, and the motor 7 is rotated at a rotational speed corresponding to the effective voltage.

The pulse train-like, pseudo-AC output voltage is controlled by pulse width modulation at PWM generator 5. In this embodiment, an actual output voltage (e.g., high output voltage or low output voltage from inverter circuit 4 is detected PWM generator 5 via resistive divider circuit 8. In particular, an actual output voltage of each output phase is detected by a current flowing in a shunt resistance by the ON/OFF operation of each switching element in three-phase, inverter circuit 4. Output indicator 9 for setting a target output voltage (i.e., voltage value to be output) is connected to PWM generator 5, and the target output voltage is provided from output indicator 9 to PWM generator 5.

PWM generator 5 controls an output duty cycle, so that the above-described, detected output voltage becomes a target output voltage provided from output indicator 9. The output duty cycle may equal a target output voltage divided by the difference between the detected, high output voltage and the detected, low output voltage. In order to achieve the output duty thus calculated, PWM control is accomplished by PWM generator 5. The maximum value of the output duty cycle is 100%. By such control of the output duty cycle, the output effective voltage output to motor 7 is controlled at the above-described, target output voltage.

The above-described detection and calculation may be accomplished by the control method depicted in FIG. 2. In particular, the voltage of a phase outputting an high output voltage is detected at step S1, and the voltage of a phase outputting a low output voltage is detected at step S2. An output duty cycle then is calculated based on the detected voltages at step S3, and PWM control is accomplished, and PWM output is provided, so that the calculated output duty is achieved at step S4. The detection and calculation due to this method is carried out repeatedly.

Thus, because the actually output voltage value is detected without detecting a voltage fluctuation of DC power source 3, the output duty cycle is determined, so that the detected voltage becomes a desirable target voltage due to output indicator 9. PWM control is accomplished so as to achieve the determined output duty cycle, even if voltage reduction at DC power source 3 side or voltage elevation due to regenerated current or the like occurs. Regardless of such a fluctuation of the voltage of the power source, the output voltage to motor 7 may be maintained at a desirable target voltage accurately and stably. Therefore, the fluctuation of the rotational speed of motor originating from the fluctuation of the voltage of DC power source 3 may be reduced or eliminated, and motor 7 may be driven stably at a predetermined rotational speed.

The inverter unit according to the present invention and of the known control system described in the aforementioned Japanese Patent No. 3,084,941 may be compared as follows. Although a detector for detecting a voltage of a power source is necessary in the known system, it is not necessary in the present invention. Therefore, the circuit may be less complicated in the present invention. Further, although it is not necessary to detect an output voltage in the known system, an actually output voltage is detected in the present invention. In the present invention, because an actual output voltage is controlled, it is not necessary to consider the effect on control due to a time delay as in the known system, and the control accuracy may be significantly improved. Moreover, when a three-phase, brushless motor 7 is driven as in the above-described embodiment, because the detection of an output voltage is required for detection of position, detection of position also may be used for detection of the output voltage. Therefore, without forming a more complicated circuit, the circuit readily may be achieved for carrying out the present invention. Consequently, the present invention may be carried out by a less complicated circuit.

Although the above-describe embodiment has been explained for an embodiment in which the present invention is applied to a voltage application circuit for a three-phase, brushless motor, the present invention may be applied to any type of inverter unit for converting a DC voltage from a DC power source into a pulse train-like, pseudo-AC voltage. In particular, the present invention is suitably applied to a voltage application circuit to a motor for driving a compressor in an air conditioning system for vehicles, in which a fluctuation of voltage of power source is likely to occur.

Although only one embodiment of the present invention has been described in detail herein, the scope of the invention is not limited thereto. It will be appreciated by those skilled in the art that various modifications may be made without departing from the scope of the invention. Accordingly, the embodiment disclosed herein is only exemplary. It is to be understood that the scope of the invention is not to be limited thereby, but is to be determined by the claims which follow.

What is claimed is:

1. An inverter unit comprising a DC power source, an inverter circuit having a plurality of pairs of switching elements, in each pair of which the switching elements are coupled in series, and which pairs of switching elements are connected in parallel to said DC power source, so that a DC voltage of said DC power source is converted into a pulse train-like, pseudo-AC voltage output from said inverter circuit, and a PWM generator connected to said inverter circuit and capable of adjusting said pseudo-AC voltage by pulse width modulation, said inverter unit comprising:

means for detecting an actual output voltage output from said inverter circuit; and means for controlling an output duty cycle, so that an output voltage detected by said means for detecting becomes a target output voltage;

wherein said output duty cycle equals a target output voltage divided by a difference between a detected, high output voltage and a detected, low output voltage, and wherein said detected, high output voltage is a maximum voltage value detected in said pulse train-like, pseudo-AC voltage, and said detected, low output voltage is a minimum voltage value detected in said pulse train-like, pseudo-AC voltage.

2. The inverter unit of claim 1, wherein said target output voltage is provided from an output indicator to said PWM generator.

3. A method for controlling an inverter unit, said process comprising the steps of:

detecting a high voltage output phase;

detecting a low voltage output phase;

calculating an output duty cycle; and outputting a pulse width modulation signal to achieve said duty cycle;

wherein said output duty cycle equals a target output voltage divided by a difference between a detected, high output voltage and a detected, low output voltage, and wherein said detected, high output voltage is a maximum voltage value in said pulse train-like, pseudo-AC voltage, and said detected, low output voltage is a minimum voltage value in said pulse train-like, pseudo-AC voltage.

4. A method for controlling an inverter unit, said process comprising the steps of:

detecting one of a high voltage output phase and a low voltage output phase;

assigning a value of zero to the other of said high voltage output phase and said low voltage output phase;

calculating an output duty cycle; and outputting a pulse width modulation signal to achieve said duty cycle;

wherein said output duty cycle equals a target output voltage divided by a difference between a detected, high output voltage and a detected, low output voltage, and wherein said detected, high output voltage is a maximum voltage value in said pulse train-like, pseudo-AC voltage, and said detected, low output voltage is a minimum voltage value in said pulse train-like, pseudo-AC voltage.

* * * * *